Figure 1:
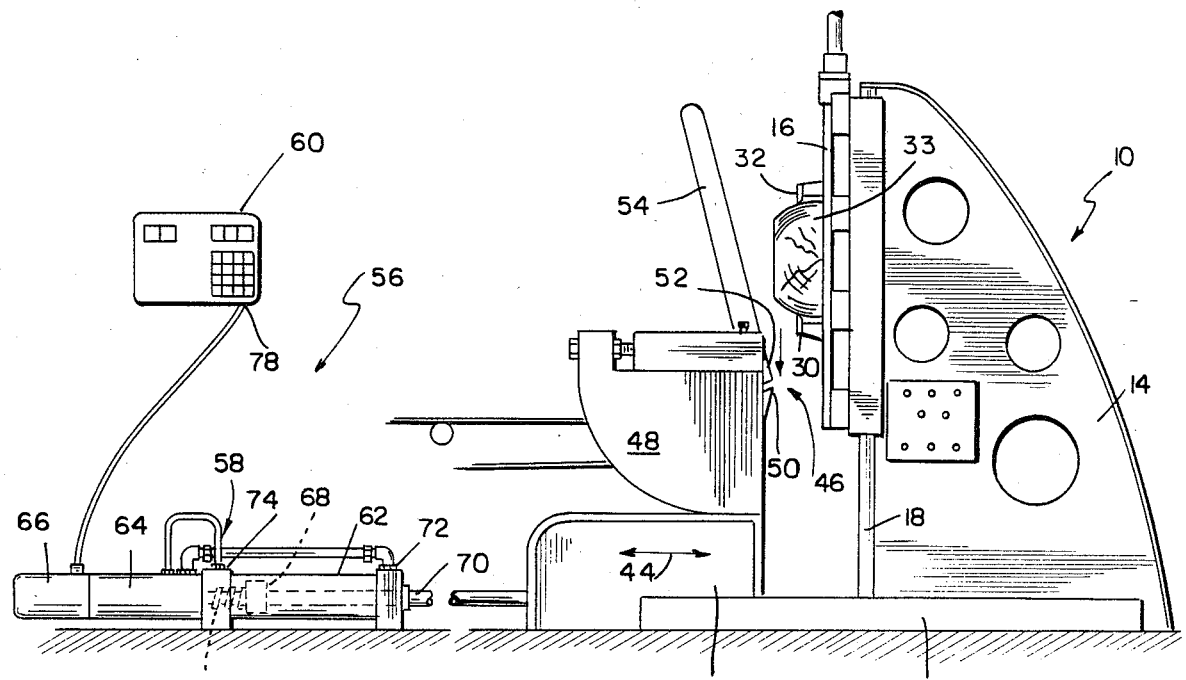

United States Patent [19]

Weil

[11] Patent Number: 4,587,616
[45] Date of Patent: May 6, 1986

[54] CONTROL SYSTEM FOR VENEER SLICER

[75] Inventor: George Weil, Mississauga, Canada

[73] Assignee: David R. Webb Co., Inc., Edinburgh, Ind.

[21] Appl. No.: 499,503

[22] Filed: May 31, 1983

[51] Int. Cl.⁴ .............................................. G06F 15/46
[52] U.S. Cl. .................................. 364/475; 144/209 R; 144/357; 318/571
[58] Field of Search ................ 364/475, 474; 144/212, 144/213, 209 R, 353, 356, 357; 318/571; 82/2 B

[56] References Cited

U.S. PATENT DOCUMENTS

| | | | |
|---|---|---|---|
| 793,306 | 6/1905 | Koss. | |
| 3,441,069 | 4/1969 | Koss | 144/309 |
| 3,680,612 | 8/1972 | Hale | 144/178 |
| 3,680,613 | 8/1972 | Daniels et al. | 144/209 R |
| 3,698,268 | 10/1972 | Cutler | 364/475 |
| 3,834,256 | 9/1974 | Abbatiello et al. | 82/2 B |
| 3,851,550 | 12/1974 | Schalles | 82/2 B |
| 3,987,350 | 10/1976 | Pomella et al. | 318/571 |
| 4,066,944 | 1/1978 | Leenhouts | 318/571 |
| 4,089,354 | 5/1978 | Cremona et al. | 144/178 |
| 4,136,302 | 1/1979 | Flaker et al. | 318/571 |
| 4,287,462 | 9/1981 | Beck et al. | 144/209 R |
| 4,291,262 | 9/1981 | Nakajima | 318/571 |
| 4,313,481 | 2/1982 | Cremona et al. | 144/209 B |
| 4,350,065 | 9/1982 | Hayashi et al. | 364/475 |

OTHER PUBLICATIONS

Linear Electro-Hydraulic Stepper Drive—Operation, Installation and Maintenance Manual—Model LS-300, Olsen Controls, Inc.
Profiler II Operator Manual, Kiowa Corp., (Revised 12/3/1981).

*Primary Examiner*—Jerry Smith
*Assistant Examiner*—John R. Lastova
*Attorney, Agent, or Firm*—Barnes & Thornburg

[57] ABSTRACT

According to the present invention, a control system is provided for advancing and retracting the knife and pressure bar carriage of a veneer slicer. This system replaces the conventional feed screw carriage actuator and permits the knife and pressure bar tilt mechanism to be eliminated. The control system includes a hydraulic linear actuator for incrementally advancing and retracting the carriage and a programmable linear motion controller for controlling the sequence in which the linear actuator advances and retracts the carriage and the distance which the linear actuator advances and retracts the carriage. The controller includes a memory into which a program is loaded. The program determines the sequence, direction and distance that the linear actuator advances and retracts the carriage.

11 Claims, 2 Drawing Figures

U.S. Patent

May 6, 1986

4,587,616

CONTROL SYSTEM FOR VENEER SLICER

This invention relates to veneer slicers, and more particularly to a control system for controlling the movement of a knife and pressure bar carriage in a veneer slicer.

Reciprocating veneer slicers typically have reciprocating flitch tables and knife and pressure bar carriage assemblies. The flitch table, to which the flitch is held, reciprocates generally in a vertical plane and the flitch is passed over the knife to cut a slice of veneer and then returns to its initial position. The knife and pressure bar carriage is incrementally advanced toward the flitch table in order that veneer slices of uniform thickness are cut from the flitch during each cutting stroke. In order to return the flitch and flitch table to their initial position without interfering with the knife and pressure bar, conventional systems have utilized means for tilting the knife and pressure bar back away from the flitch table to insure that the flitch and flitch table clear the knife and pressure bar during the return stroke. Therefore, a disadvantage of such conventional systems is that they require actuation means not only for advancing the knife and pressure bar carriage toward the flitch table, but also actuation means for tilting the knife and pressure bar back prior to the return stroke. Illustrative of such devices is the system described in U.S. Pat. No. 3,680,612.

Conventional systems have normally utilized feed screws for advancing the knife and pressure bar carriage toward the flitch table. Typically, the knife and pressure bar carriage is advanced an incremental distance toward the flitch table during each rotation or portion of a rotation of the feed screw. Generally, a mechanical means is provided so that the knife and pressure bar carriage is advanced the incremental distance during a very small portion of the rotation and is then held stationary by the mechanical means during the rest of the rotation. Frequently a ratchet and pawl-type escapement mechanism is used to turn the feed screw incrementally and to provide the desired dwell between incremental advances. It is during this dwell that a sheet of veneer is sliced. A disadvantage of such systems is that the thickness of the veneer slice is determined by the mechanical movement limiting means, specifically by the increment of advance of the feed screw, which moves the carriage. Therefore, the slice thickness is difficult to vary.

According to the present invention, a control system is provided for advancing and retracting the knife and pressure bar carriage in a veneer slicer. This system replaces the conventional feed screw carriage actuator and permits the knife and pressure bar tilt mechanism to be eliminated. The control system includes a linear actuator for incrementally advancing and retracting the carriage and a programmable linear motion controller for controlling the sequence in which the linear actuator advances and retracts the carriage and the distance which the linear actuator advances and retracts the carriage. The controller includes a memory into which a program is loaded. The program determines the sequence, direction, and distance that the linear actuator advances and retracts the carriage.

The instant invention provides a knife and pressure bar carriage control system which permits the elimination of a tilting mechanism on a veneer slicer to permit clearance between the flitch and knife-pressure bar assembly during the return stroke of the flitch table.

The instant invention also provides a knife and pressure bar carriage control system that permits the thickness of the veneer slice being cut to be changed easily.

Figure 2:
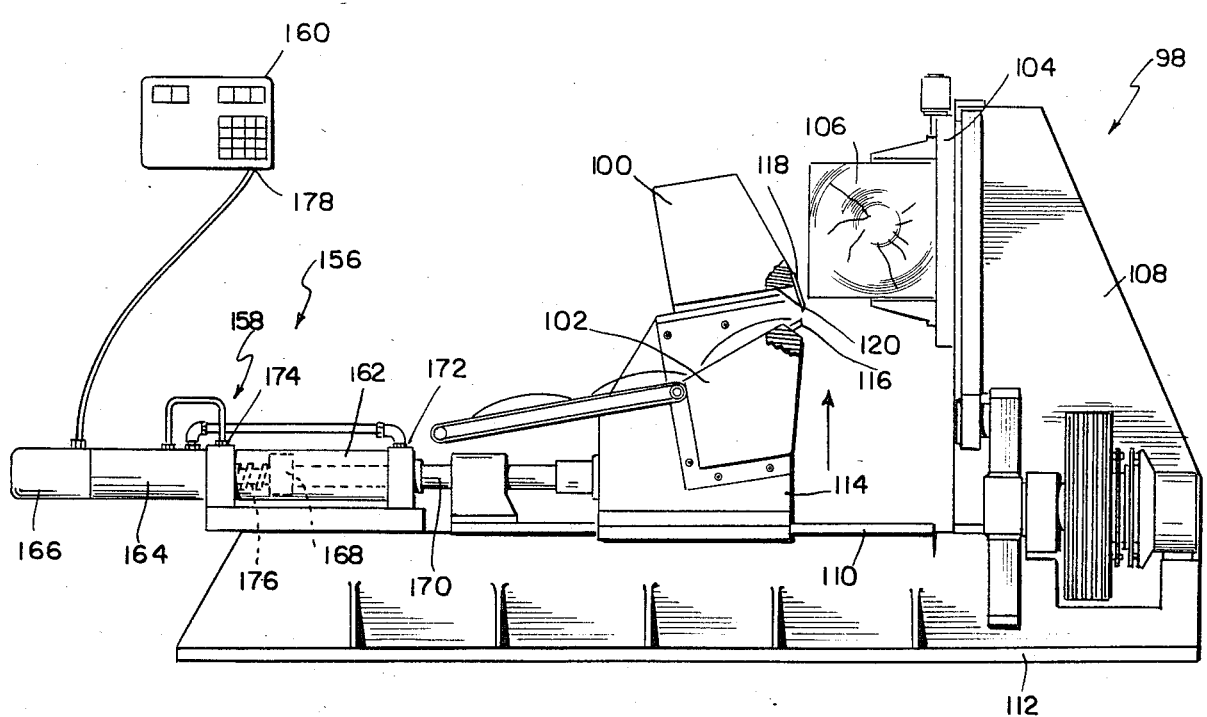

The invention may best be understood by referring to the following description and accompanying drawings which best illustrate the invention. In the drawings:

FIG. 1 is a side elevational view of a down-cut veneer slicer embodying the instant invention; and FIG. 2 is a side elevational view of an up-cut veneer slicer embodying the instant invention.

Referring to FIG. 1, a down-cut veneer slicer 10 has a base 12, flitch table supports 14 (only one of which is shown in the drawing), and a flitch table 16. This type of flitch table 16 and the means by which it is supported for reciprocation is well known and was disclosed in U.S. Pat. No. 793,306, issued to Louis Koss. For reasons which are well known in the veneer slicing art, the table 16 reciprocates in a generally vertical plane, but the reciprocation is along a line inclined with respect to vertical.

Conventionally, a plurality of transversely spaced-apart dogs 30, 32 for gripping a flitch 33 at relatively short distances from the mounting surface of the flitch table 16 and holding the flitch rigidly against a central portion of the mounting surface is provided. In the illustrated conventional system, the lower dogs 30 and the upper dogs 32 are guided for vertical reciprocation on the flitch table 16 and driven by hydraulic cylinders (not shown). Conventionally, a flitch 33 is held against the central portion of the mounting surface of the flitch table 16 to extend longitudinally therealong, and the lower dogs 30 are driven upwardly and the upper dogs 32 are driven downwardly to engage the flitch at a point approximately ⅜ inch from the mounting surface to hold the flitch rigidly against the mounting surface.

The slicer 10 includes a carriage 42 mounted on the base 12 for guided shiftable movement toward and away from the plane of reciprocation of the flitch table 16 as indicated by the arrow 44. A knife and pressure bar assembly, indicated generally by the reference numeral 46, is mounted on the carriage 42 so that the assembly is movable along a path toward and away from the mounting surface of the flitch table 16. In the illustrated slicer 10, a member 48 (commonly called a skirt) is provided for supporting the knife 50 at a point just below the pressure bar 52, the pressure bar 52 being carried by an assembly 54 (commonly called a cap) which is adjustably movable on the skirt 48. This arrangement of a knife 50, pressure bar 52, skirt 48, and cap 54 are well known and disclosed, for instance in Koss U.S. Pat. Nos. 793,306, and 3,441,069.

From the description thus far, it will be appreciated that the flitch table 16 reciprocates transversely in a generally vertical plane relative to the path of the knife and pressure bar assembly 46 and between first and second opposite positions, i.e., its upper and lower positions. The knife 50 and pressure bar 52 move inwardly toward the flitch table 16 and the flitch 33 carried thereon. As the flitch 33 moves downwardly, the knife and pressure bar assembly 46 slices a thin sheet of veneer from the flitch. The assembly 46 is advanced step-by-step toward the flitch table 16, the distance of each step being approximately equal to the thickness of the slice of veneer being cut and each step being completed before the table 16 begins to move downwardly.

Conventionally, during the slicing operation, the assembly 46, i.e., the cutting edge of the knife 50 and the contacting edge of the pressure bar 52, moves toward the flitch table 16 to the point where the assembly is just to the left of the plane defined by the movement of the dogs 30, 32. Of course, further movement of the assembly 46 to the right will bring the knife 50 and pressure bar 52 into contact with the reciprocating dogs 30, 32, thereby damaging the knife 50, pressure bar 52, and dogs 30, 32.

Therefore, after the last slice of veneer has been cut from the flitch, the assembly 46 is retracted from the flitch table 16 to a home position prior to the beginning of the slicing of a new flitch 33.

Heretofore, in conventional veneer sicers of this type, means (not shown) were provided for tilting the assembly 46 rearwardly to permit the table 16 and the flitch 33 to move to its upper position from its lower position without interfering with the knife and pressure bar assembly 46. Also, carriage 42 was typically urged toward the flitch table 42 by feed screws (not shown).

This invention improves upon veneer slicers having carriage assemblies, such as assembly 42, for shifting toward and away from a flitch table, such as table 16. The improvement comprises a control system 56 for controllably moving the carriage assembly 42 in increments toward and away from the flitch table 16. Control system 56 replaces the conventional feed screw actuation means for carriage assembly 42 with a controllable linear actuator 58 which permits the tilting mechanism for clearance between the knife and pressure bar on the one hand and the flitch table on the other hand discussed previously, to be dispensed with.

Control system 56 includes the controllable linear actuator 58 and a programmable linear motion controller 60. Linear actuator 58 includes hydraulic cylinder 62, manifold and valve-spool assembly 64, and stepping motor 66. Stepping motor 66 has a shaft (not shown) coupled to a first end of a valve spool (not shown) of the manifold and valve-spool asssembly 64 by a first rotary-to-linear motion converter (not shown).

Hydraulic cylinder 62 includes a piston 68 having a shaft 70. Shaft 70 is coupled to the carriage assembly 42 in a conventional fashion. Hydraulic cylinder 62 further includes a first pressure port 72 and a second pressure port 74. Piston 68 is reciprocable between the two pressure ports 72, 74 in the hydraulic cylinder 62.

Manifold and valve-spool assembly 64 further includes a feedback ball-screw assembly 76. Feedback and ball-screw assembly 76 couples the piston 68 to a second end (not shown) of the valve-spool of the manifold and valve-spool assembly 64 through a second rotary-to-linear motion converter (not shown).

Hydraulic cylinder 62 operates in conventional fashion, and its operation as a fluid motor is described for purposes of clarity. When a suitable source of pressurized hydraulic fluid is coupled to the pressure port 74 and pressure port 72 is coupled to a hydraulic return which is typically at a substantially lower pressure, i.e., atmospheric pressure, than the pressure of the hydraulic source, the pressure imbalance between the pressure ports 72, 74 causes a force to be exerted on piston 68 so that piston 68 moves axially outward, thereby moving shaft 70 and carriage assembly 42 axially toward flitch table 16. Conversely, when the hydraulic pressure source is coupled to the pressure port 72 and the return is coupled to pressure port 74, the force exerted on piston 68 by the resulting pressure imbalance causes it to move axially inward, thereby retracting shaft 70 and carriage assembly 42 away from flitch table 16. When the forces exerted on both sides of piston 68 are equal, the piston 68 is held stationary.

In the embodiment shown in FIG. 1, pressure ports 72, 74 are coupled to the manifold and valve-spool assembly 64. Manifold and valve-spool assembly 64 further includes a pressure port (not shown) coupled to a suitable source of hydraulic pressure (not shown) and a return port (not shown) coupled to a suitable hydraulic return (not shown). The valve-spool of the manifold and valve-spool assembly 64 couples the hydraulic pressure and hydraulic return to the pressure ports 72, 74. The valve spool has a neutral position wherein the hydraulic pressure it couples to the pressure ports 72, 74 is essentially balanced so that the force exerted on both sides of piston 68 is equalized, holding piston 68 stationary.

Controlled linear motion is illustratively described with reference to axial outward movement of piston 68 which moves the carriage assembly 42 axially toward the flitch table 16. Programmable linear motion controller 60 causes stepping motor 66 to rotate its shaft a specified number of steps. The rotational motion of the shaft of stepping motor 66 is translated to linear motion by the first rotary-to-linear converter axially displacing the valve spool of manifold and valve-spool assembly 64 a direction and distance determined by the direction of rotatation and the number of steps the shaft of stepping motor 66 makes. The axial displacement of the valve-spool away from its neutral position creates a pressure imbalance between the pressure ports 72, 74 of hydraulic cylinder 62. For outward axial movement of piston 68, the pressure at pressure port 74 will exceed the pressure at pressure port 72, thereby generating a force against an axially inwardly facing surface of piston 68, urging the piston 68 axially outward and the carriage assembly 42 toward the flitch table 16.

As piston 68 moves axially outward, the feedback and ball-screw assembly 76 is caused to rotate. The rotational motion of the feedback and ball-screw assembly 76 is translated to linear motion by the second rotary-to-linear motion converter and urges the valve spool of manifold and valve-spool assembly 64 axially back toward its neutral position. Consequently, after piston 68 has traveled a sufficient distance, the valve-spool will have been urged back into its neutral position, and piston 68 will again be held stationary. As can be appreciated, the distance piston 68 moves is directly related to the amount that the valve-spool is displaced, which is determined by the number of steps that the shaft of stepping motor 66 rotates. Illustratively, linear actuator 58 is a Model LS-300 Linear Electro-Hydraulic Stepper Drive manufactured by Olsen Controls, Inc., 664 Birch Street, Bristol, Conn. 06010. In the Model LS-300, the piston 68 advances and retracts 0.001 inch for each step of the shaft of the stepping motor 66.

Programmable linear motion controller 60 is a microprocessor based controller having inputs, outputs, memory, and means for entering a program into the memory. The outputs include stepping motor control outputs 78 which are coupled to the stepping motor 66 in a conventional manner.

The program which is entered into the memory of controller 60 contains numerical data which determines the direction of rotation and the number of steps the stepping motor 66 will make. Illustratively, the term "index" is used to describe each time the stepping motor is caused to rotate thereby causing piston 68 to advance or retract.

An input of controller 60 is coupled to sense the position of the flitch table 16. This input can be from one or more microswitches which sense flitch table 16 position, for example. The program causes the stepping motor to execute an initial index and a sequence of advance indexes. After each advance index and the initial index the stepping motor 66 is caused to execute a retract index. After the final advance index, the stepping motor 66 is caused to execute a return retract index to return the carriage assembly 42 to an initial position.

Controller 60 causes the stepping motor 66 to rotatably step the direction and number of steps in the initial index. This axially advances piston 68, moving carriage assembly 42 to an initial position so that the movement of the flitch table 16 in a cutting stroke causes the knife 50 to cut a first slice of veneer from the flitch 33. It may be desirable to only advance carriage assembly 42 to an initial position wherein a veneer slice would only be cut when the largest flitch 33 is being sliced. Although this would necessitate several cutting cycles in which a veneer slice is not cut when a smaller flitch is used, it would permit the same program to be used for all sizes of flitches for a given thickness of veneer slices.

After the carriage assembly 42 has been advanced to the initial position, flitch table 16 moves the flitch 33 against the knife 50 in a cutting stroke, shearing a slice of veneer from the flitch 33. After the flitch table 16 has completed the cutting stroke, controller 60 executes a retract index which causes stepping motor 66 to rotate an appropriate number of steps to cause piston 68 to move axially inward and retract carriage assembly 42 away from flitch table 16. After the retract index has been completed, flitch table 16 moves in a return stroke back to its initial position. The retraction of carriage assembly 42 permits the flitch table 16 to move in its upstroke safely past the knife 50 and the pressure bar 52 without tilting the knife 50 and pressure bar 52 as was necessary in prior art systems. See U.S. Pat. No. 3,680,612.

After the flitch table 16 has returned to its initial position, the controller 60 executes an advance index which moves carriage assembly 42 back into a cutting position. The controller 60 continues to cause stepping motor 66 to execute successive advance and retract indices until the last slice of veneer has been cut from the flitch. The controller 60 then executes the return retract index which returns the carriage assembly 42 to the initial position.

As has been discussed, each index comprises a series of stepping motor 66 steps in a given direction. Therefore, the thickness of the veneer slices is determined by the number of steps in an advance index as compared to the number of steps in a retract index. In a preferred embodiment, each advance index comprises 26 steps which advances the carriage assembly 42 0.026 inch and each retract index comprises 25 steps which retracts the carriage assembly 42 0.025 inch. As simple subtraction indicates, the thickness of the veneer slices will be 0.001 inch. Should veneer slices of a different thickness be desired, it is a simple matter to change these variables in the controller 60 program to achieve the desired veneer thickness. Illustratively, controller 60 is a Profiler II Programmable Motion Controller manufactured by Kiowa Corporation, Eden Prairie, Minn.

In the embodiment shown in FIG. 2, an up-cut veneer slicer 98 has a machine-mounting base 112 which includes a vertically extending slideway 110 with a flitch table 104 and a horizontally extending slideway 110 for a cutting mechanism support unit 114. The support unit 114 is shifted horizontally backwardly and forwardly along the horizontally extending slideway 110 for the purposes of advancing or retracting the support unit 114 from a flitch 106 held on flitch table 104.

The cutting mechanism support unit 114 provides a mounting or a bar-carrying unit 102 which contains a pressure bar 116 which is positioned below a knife blade 118 which is carried on a blade-holding unit 100. A lower edge 120 of the knife blade 118 is obliquely oriented so that during each cut the knife blade 118 cuts a strip of veneer from the flitch 106 when the flitch is moved upwardly in relationship to the knife blade 118.

A control system 156 replaces the conventional feed screw actuation means for the cutting mechanism support unit 114 with a controllable linear actuator 158 which permits the knife blade and pressure bar tilting mechanism discussed previously to be dispensed with.

Control system 156 includes the controllable linear actuator 158 and a programmable linear motion controller 160. Linear actuator 158 includes hydraulic cylinder 162, manifold and valve-spool assembly 164, and stepping motor 166, all as discussed in connection with FIG. 1. Again, illustratively, linear actuator 158 is a Model LS-300 Linear Electro-Hydraulic Stepper Drive manufactured by Olsen Controls, Inc., 664 Birch Street, Bristol, Conn. 06010. In the Model LS-300, the piston 168 advances and retracts 0.001 inch for each step of the shaft of the stepping motor 166.

Programmable linear motion controller 160 is a microprocessor-based controller having inputs, outputs, memory, and means for entering a program into the memory. The outputs include stepping motor control outputs 178 which are coupled to the stepping motor 166 in a conventional manner.

The program which is entered into the memory of controller 160 contains numerical data which determines the direction of rotation and the number of steps the stepping motor 166 will make. Illustratively, the term "index" is used to describe each time the stepping motor is caused to rotate thereby causing piston 168 to advance or retract.

An input of controller 160 is coupled to sense the position of the flitch table 104. The program causes the stepping motor to execute an initial index and a sequence of advance indexes. After each advance index and the initial index the stepping motor 166 is caused to execute a retract index. After the final advance index, the stepping motor 166 is caused to execute a return retract index to return the cutting mechanism support unit 114 to an initial position.

Controller 160 causes the stepping motor 166 to rotatably step the direction and number of steps in the initial index. This axially advances piston 168, moving cutting mechanism support unit 114 to an initial position so that the movement of the flitch table 104 in a cutting stroke causes the knife blade 118 to cut a first slice of veneer from the flitch 106. Again, it may be desirable to only advance cutting mechanism support unit 114 to an initial position wherein a veneer slice would only be cut when the largest flitch 106 is being sliced. Although this would necessitate several cutting cycles in which a veneer slice is not cut when a smaller flitch is used, it would permit the same program to be used for all sizes of flitches for a given thickness of veneer slices.

After the cutting mechanism support unit 114 has been advanced to the initial position, flitch table 104 moves the flitch 106 against the knife blade 118 in a cutting stroke, shearing a slice of veneer from the flitch 106. After the flitch table 104 has completed the cutting stroke, controller 160 executes a retract index which causes stepping motor 166 to rotate an appropriate number of steps to cause piston 168 to move axially inward and retract cutting mechanism support unit 114 away from flitch table 104. After the retract index has been completed, flitch table 104 moves in a return stroke back to its initial position. The retraction of cutting mechanism support unit 114 permits the flitch table 104 to move in its downstroke safely past the knife blade 118 and the pressure bar 116 without tilting the knife blade 118 and pressure bar 116 as was necessary in prior art systems. See U.S. Pat. No. 4,089,354.

After the flitch table 104 has returned to its initial position, the controller 160 executes an advance index which moves cutting mechanism support unit 114 back into a cutting position. The controller 160 continues to cause stepping motor 166 to execute successive advance and retract indices until the last slice of veneer has been cut from the flitch 106. The controller 160 then executes the return retract index which returns the cutting mechanism support unit 114 to the initial position.

As has been discussed, each index comprises a series of stepping motor 166 steps in a given direction. Therefore, the thickness of the veneer slices is determined by the number of steps in an advance index as compared to the number of steps in a retract index. In a preferred embodiment, each advance index comprises 26 steps which advances the cutting mechanism support unit 114 0.026 inch and each retract index comprises 25 steps which retracts the cutting mechanism support unit 114 0.025 inch. The thickness of the veneer slices thus is 0.001 inch. Should veneer slices of a different thickness be desired, it is a simple matter to change these variables in the controller 160 program to achieve the desired veneer thickness. Again, illustratively, controller 160 is a Profiler II Programmable Motion Controller manufactured by Kiowa Corporation, Eden Prairie, Minn.

What is claimed is:

1. In a reciprocating veneer slicer comprising a flitch table providing a mounting surface, means for securing a flitch to the mounting surface, a knife and pressure bar assembly movable along a path toward and away from the mounting surface, the flitch table being reciprocable between first and second opposite positions transversely relative to the path of the knife and pressure bar assembly in a cutting and return stroke, the improvement comprising a linear hydraulic actuator for advancing the knife and pressure bar assembly toward the mounting surface prior to the cutting stroke to provide a uniform depth of cut and for retracting the knife and pressure bar assembly away from the mounting surface after the cutting stroke and prior to the return stroke, the linear hydraulic actuator advancing and retracting the knife and pressure bar assembly in indexes, an index comprising one or more steps of uniform incremental distance, advance indexes after an initial index consisting of an equal number of steps, retract indexes prior to a final retract index consisting of an equal number of steps, the depth of cut determined by the difference the number of steps in the advance and retract indexes.

2. The improvement of claim 1 and further comprising control means for initiating the advance and retract indexes of the linear hydraulic actuator and means for coupling the control means to the linear hydraulic actuator.

3. The improvement of claim 2 wherein the control means includes means for entering the number of steps for the initial advance index, the advance index, the retract index, and the final retract index.

4. The improvement of claim 3 wherein the linear hydraulic actuator comprises a linear electro-hydraulic stepper drive including a stepper motor, a rotary input servovalve, a hydraulic motor and manifold, and a ballscrew and nut feedback assembly, the control means comprises a programmable motion controller including a microprocessor, stepping motor control outputs, memory, and means for entering a program into the memory, means for coupling the stepper motor control outputs to the stepping motor of the linear electrohydraulic stepper drive, the program steps stored in memory, the microprocessor executing the program steps and setting the stepping motor control outputs, the stepping motor control outputs controlling the number of steps the stepping motor steps, the hydraulic motor protracting and retracting distances according to the number and direction of steps the stepping motor steps, and means for coupling the hydraulic motor to the knife and pressure bar assembly.

5. The improvement of claim 4 wherein the number of steps in an index is entered into and stored in the memory.

6. A reciprocating veneer slicer comprising a reciprocating flitch table including means for holding a flitch, means for reciprocably moving the flitch table, a knife and pressure bar assembly mounted on a carriage, a linear hydraulic actuator for advancing the carriage toward, and retracting the carriage from, a plane in which the flitch table reciprocates, a programmable control means for causing the linear hydraulic actuator to advance and retract the carriage distances determined by the programmable control means, and means for coupling the programmable control means to the carriage.

7. The apparatus in claim 6 wherein the programmable control means comprises a numerical controller having a means for entering a program for determining a travel sequence of the carriage.

8. The apparatus of claim 6 wherein the flitch table moving means reciprocably moves the flitch table in a cutting stroke and a return stroke, the programmable control means comprising a microprocessor-based controller including a memory for storing numerical data corresponding to a distance the carriage is advanced toward the flitch table after each return stroke and before each cutting stroke and a distance the carriage is retracted from the flitch table after each cutting stroke and before each return stroke, the programmable control means causing the actuator to advance and retract the carriage the distances specified by the numerical data.

9. The apparatus of claim 8 wherein the numerical data comprises data which the programmable control means processes and causes the actuator to advance the carriage a proper distance before each cutting stroke such that a veneer slice cut from the flitch in each cutting stroke has essentially the same thickness as veneer slices cut in other cutting strokes, and to retract the carriage before each return stroke so that the flitch clears the knife during the return stroke.

10. The apparatus in claim 6 wherein the actuator comprises an electro-hydraulic drive having a stepping motor and a piston-and-cylinder fluid motor, and the means for coupling the actuator to the carriage comprises a shaft for coupling the piston to the carriage, the stepping motor driving the piston in a direction and a distance determined by the number and direction of rotation of the steps the motor takes, and the means for coupling the programmable control means to the actuator comprises means for coupling the stepping motor to the programmable control means.

11. The apparatus in claim 10 wherein the programmable control means comprises a programmable stepping motor controller.

* * * * *

UNITED STATES PATENT AND TRADEMARK OFFICE
CERTIFICATE OF CORRECTION

PATENT NO. : 4,587,616

DATED : May 6, 1986

INVENTOR(S) : George Weil

It is certified that error appears in the above-identified patent and that said Letters Patent is hereby corrected as shown below:

At column 7, line 64, after "difference" insert --between--.

Signed and Sealed this

Twelfth Day of August 1986

[SEAL]

Attest:

DONALD J. QUIGG

Attesting Officer

Commissioner of Patents and Trademarks